(12) United States Patent
Krige

(10) Patent No.: US 8,162,559 B2
(45) Date of Patent: Apr. 24, 2012

(54) CONNECTOR FOR PANELS OR PANEL-LIKE COMPONENTS

(75) Inventor: Pieter Retief Krige, Stellenbosch (ZA)

(73) Assignee: RK Intellectual Property (Pty) Ltd, Western Cape Province (ZA)

( * ) Notice: Subject to any disclaimer, the term of this patent is extended or adjusted under 35 U.S.C. 154(b) by 173 days.

(21) Appl. No.: 12/772,710

(22) Filed: May 3, 2010

(65) Prior Publication Data

US 2010/0205888 A1    Aug. 19, 2010

Related U.S. Application Data

(63) Continuation-in-part of application No. 12/300,771, filed as application No. PCT/IB2007/001259 on May 15, 2007, now abandoned.

(30) Foreign Application Priority Data

May 18, 2006  (ZA) .................................. 2006/04002

(51) Int. Cl.
*F16B 5/02*    (2006.01)
(52) U.S. Cl. ................ 403/259; 403/231; 403/DIG. 10; 403/DIG. 12; 312/263; 108/193
(58) Field of Classification Search .................. 403/188, 403/231, 256, 258–260, DIG. 10, DIG. 12; 411/104; 312/257.1, 263, 265; 108/193, 108/147.16

See application file for complete search history.

(56) References Cited

U.S. PATENT DOCUMENTS

| | | | | |
|---|---|---|---|---|
| 3,006,231 | A * | 10/1961 | Kahn | 411/435 |
| 3,198,562 | A * | 8/1965 | Smith | 403/7 |
| 3,271,056 | A * | 9/1966 | Frisbey, Jr. | 403/376 |
| 3,274,744 | A * | 9/1966 | Blum et al. | 52/704 |
| 4,060,949 | A * | 12/1977 | Busse | 403/231 |
| 4,998,701 | A * | 3/1991 | Rawald | 248/224.7 |
| 5,368,426 | A * | 11/1994 | Reeves | 411/104 |
| 5,425,610 | A * | 6/1995 | Weidner et al. | 411/437 |
| 5,458,429 | A * | 10/1995 | Shimoda | 403/258 |
| 5,464,299 | A * | 11/1995 | Scharer et al. | 403/297 |
| 5,785,461 | A * | 7/1998 | Lambert | 403/167 |
| 6,908,252 | B1 * | 6/2005 | Rubano | 403/231 |

* cited by examiner

*Primary Examiner* — Joshua Kennedy
(74) *Attorney, Agent, or Firm* — Nelson Mullins Riley & Scarborough LLP; Jane E. Remillard; Neslihan I. Doran

(57) ABSTRACT

A connector is provided for connecting a first panel to a second panel with the first panel having one edge thereof fixed relative to a surface of the second panel and the two panels extending transversely, typically at right angles, to each other. The connector includes an anchor unit for cooperation with an aperture through the first panel inwardly of the one edge thereof and a nut captive relative to the anchor unit for receiving a fastener passing through the second panel for urging the anchor unit towards the second panel. The anchor unit includes a first component and a second component each of which has a generally planar base with one or more attachment lugs receiving the fastener. The peripheral edge of the base, in each case, is shaped so that the base covers and obscures the aperture with a flat abutment edge engaging the second panel.

12 Claims, 6 Drawing Sheets

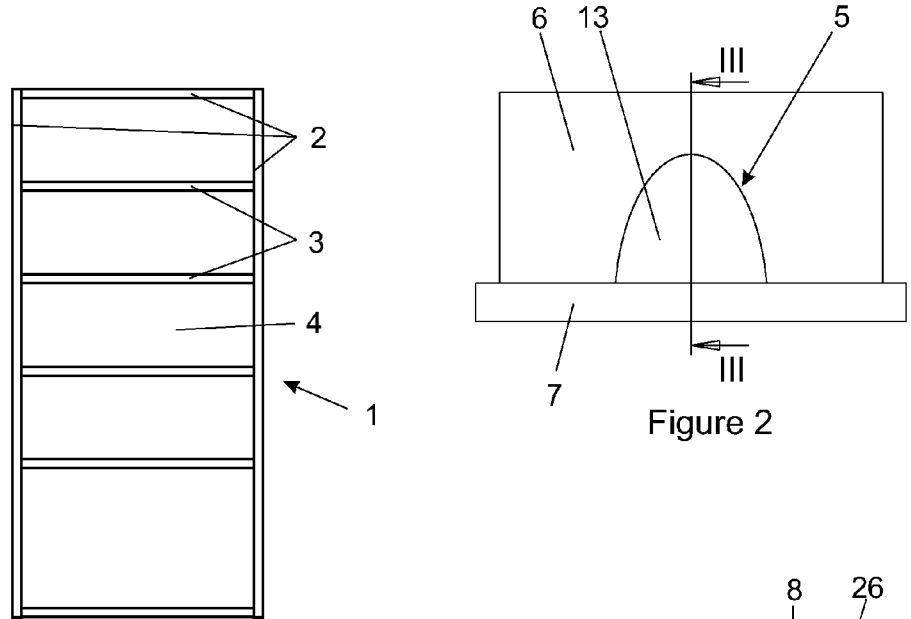
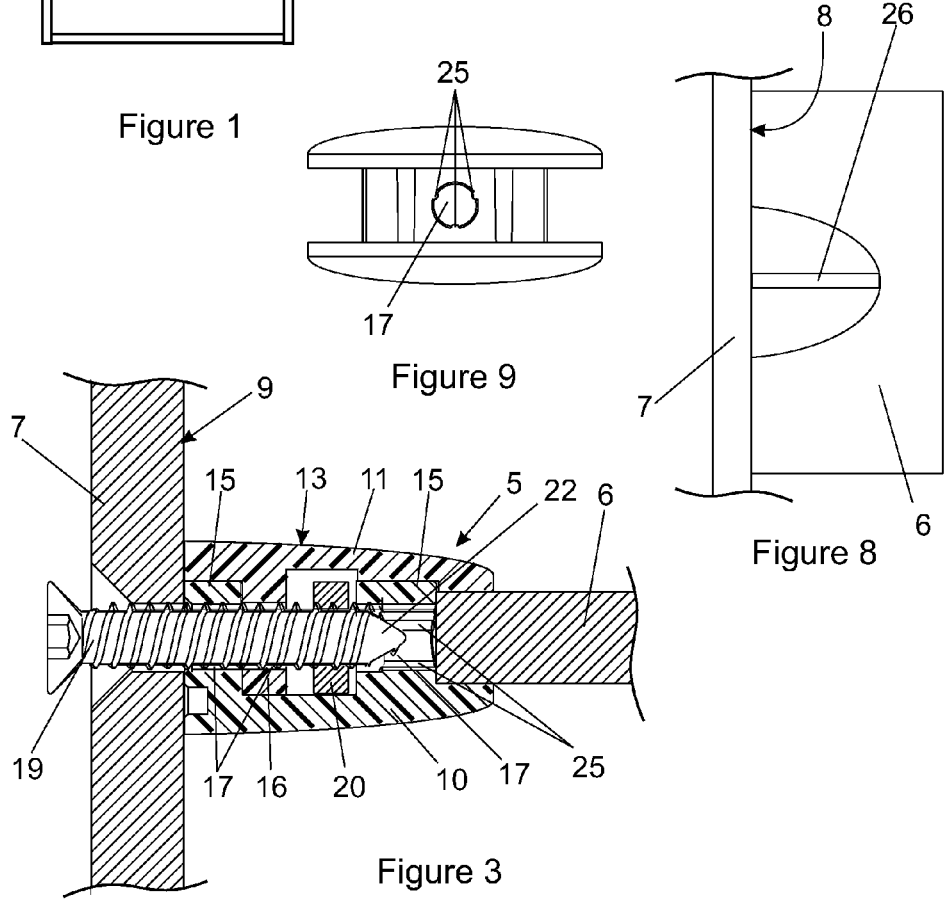

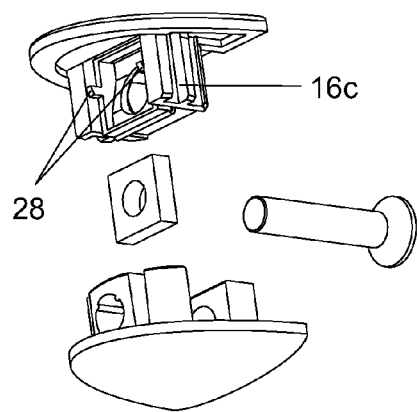
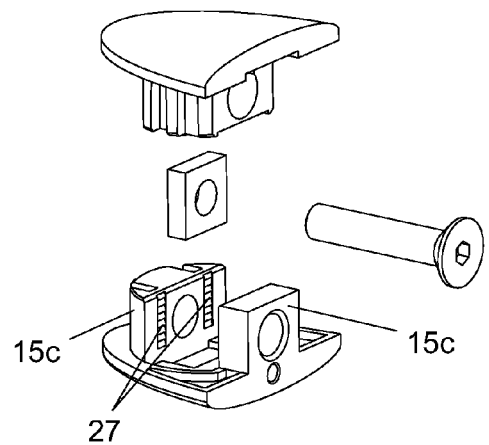
Figure 13
Figure 14
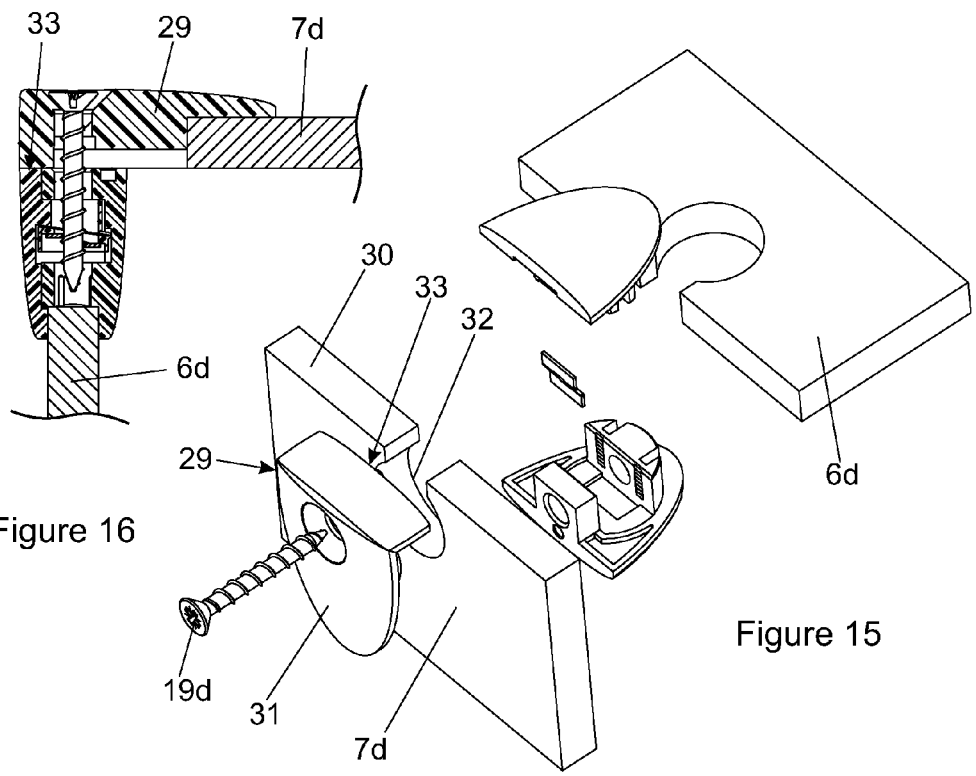
Figure 16
Figure 15

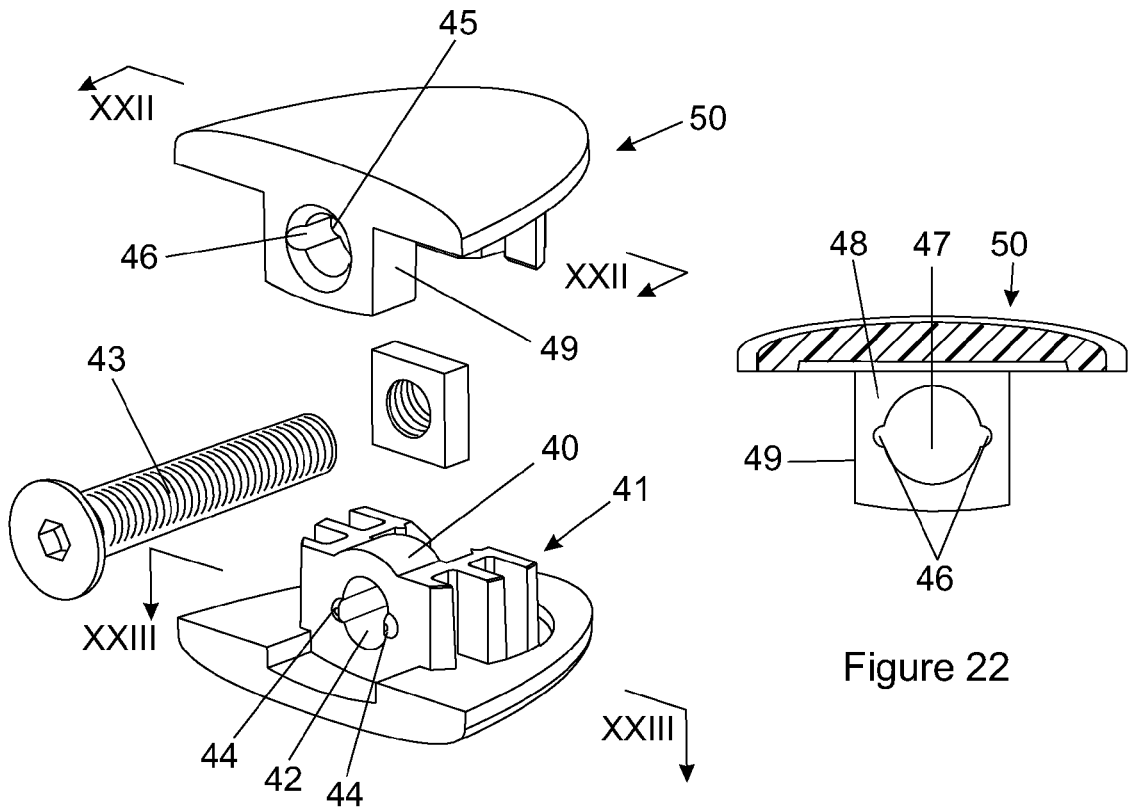
Figure 21
Figure 22
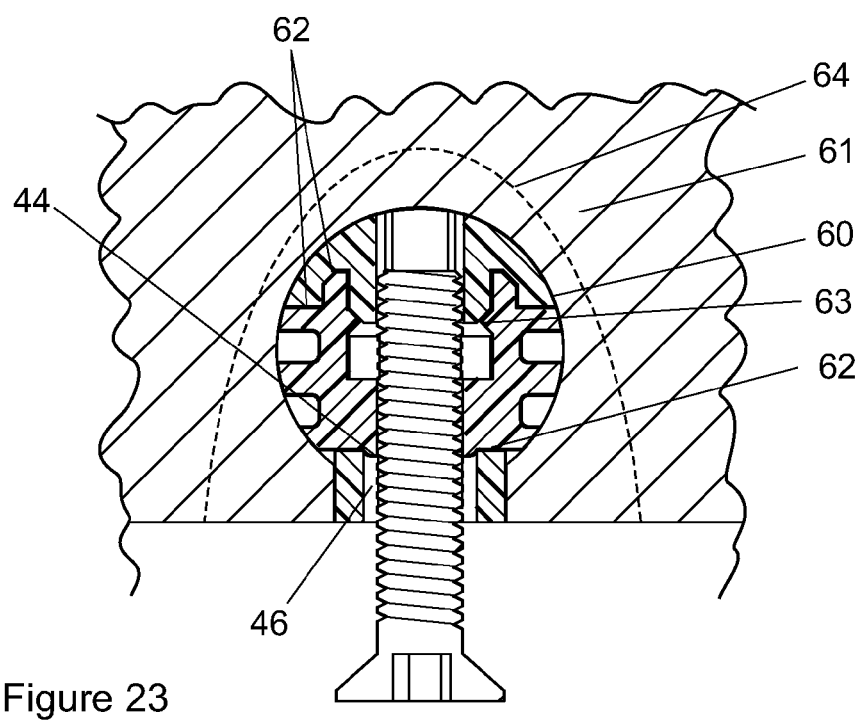
Figure 23

CONNECTOR FOR PANELS OR PANEL-LIKE COMPONENTS

RELATED APPLICATION

This application is a continuation-in-part of U.S. patent application Ser. No. 12/300,771 filed Nov. 13, 2008 which is a United States national phase of PCT Patent Application No. PCT/IB2007/001259 filed May 15, 2007 and claims priority to South African Application No. 2006/04002 filed May 18, 2006, the contents of which are hereby incorporated by reference.

FIELD OF THE INVENTION

This invention relates to a connector that is suitable for use in connecting panels or panel-like components (hereinafter simply termed panels irrespective of their exact nature and function and including frame members and the like), particularly, but not exclusively, panels of articles of furniture and other functional structures, wherein the connection is either releasable or permanent.

More particularly, the invention relates to a connector that is particularly adapted for connecting one panel to another with the two panels oriented in intersecting planes, typically, but not necessarily, at right angles to each other, and with an edge of one panel held fast relative to a surface or an edge of the other panel.

The invention also relates to panels, especially furniture panels and panels of knockdown structures that are adapted to be secured to other panels by means of connectors of this invention as well as to completed assemblies of such panels optionally together with other components.

BACKGROUND TO THE INVENTION

A variety of different connectors is available for connecting components, in particular furniture components, together with an edge of one panel or panel-like component held fast relative to a surface or edge of another panel. Such fasteners include wood screws, self tapping screws, machine screws (usually in combination with co-operating nuts), dowels of various different configurations and the like.

There are also in use certain cam action locking devices that are typically used in relation to furniture of a "knockdown" type and that often have a headed pin anchored into one panel or other component with the pin extending operatively into a bore extending into an adjacent edge of a panel and wherein a cam or other locking device locks the head of the pin in its assembled position to connect the panel in edge-on relationship relative to the other panel or component.

These arrangements suffer from various disadvantages including the possibility of damage to the panels with consequent unsightly surface cracks and other blemishes and also the possibility of instability of the assembled components. These comments are particularly pertinent in relation to thin panels such as plywood, composition board, chipboard and other boards made of reconstituted timber. Also, the specially made components for such a connector may be relatively costly.

One proposal that has been put forward to overcome structural weaknesses is described in U.S. Pat. No. 4,188,148 to Waibel. In this instance an anchor member is inserted through an aperture near the edge of a first panel and the anchor member and thus the edge of the first panel is drawn towards the surface of a second panel by a screw threaded fastener extending into the anchor member in the general plane of the first panel. The fastener is located in a narrowed neck portion of the aperture that has a key-hole type of configuration.

The drawback of this arrangement is that the anchor member projects significantly from both surfaces of the first panel and the balance of the aperture, including its neck portion, is exposed, thereby resulting in an unsightly appearance. Applicant accordingly regards such a connector arrangement as unsuitable for a large number of different purposes that require a neat and attractive appearance. Also, the anchor members are likely to interfere with co-operating objects, in use.

OBJECT OF THE INVENTION

It is an object of this invention to provide a connector for the purpose indicated wherein at least one of the disadvantages perceived of existing connectors is overcome, at least some extent.

SUMMARY OF THE INVENTION

In accordance with one aspect of this invention there is provided a connector for connecting a first panel to a second panel with the first panel having one edge thereof fixed relative to a surface of the second panel and the two panels extending transversely to each other such that the first panel extends away from the second panel at generally right angles, the connector comprising an anchor unit for operative cooperation with an aperture through the first panel inwardly of said one edge thereof and a nut that is captive relative to the anchor unit for operatively receiving a fastener passing through the second panel for urging the anchor unit towards the second panel to thereby connect the first and second panels together, wherein the anchor unit comprises a first component and a second component each of which has a generally planar base having an operatively outer surface with a shape selected from a shallow domed configuration and a flat configuration that can be recessed into the surface of the first panel so as to be flush with it, an inner surface from which one or more attachment lugs extend, and a peripheral edge, wherein the peripheral shape of each of the two components includes a flat abutment edge oriented in a plane at generally right angles to the planar base for engaging the surface of the second panel in the assembled position and wherein the attachment lugs are configured to overlap in the assembled condition of the anchor unit with the lugs having holes therethrough for receiving the fastener to retain, in the operative condition, the anchor unit in the assembled condition of the connector by cooperation with the nut or the fastener, or both, and to locate the connector in a plane of the first panel and wherein an outer periphery of each lug is shaped for operative cooperation with the aperture through the first panel to locate the connector in the plane of the first panel.

Further features of the invention provide for the lugs to be formed such that installation or tightening of the fastener results in the two components of the anchor unit being urged inwardly towards each other to firmly clamp the peripheral region of the bases against the cooperant surfaces of the first panel, in use; for the lugs to include cooperating formations for retaining the two components in cooperating relationship in the absence of a fastener for transport and storage purposes; for the cooperating formations to be selected from at least one projection on a face of a lug that is at generally right angles to a fastener axis and a cooperating recess on an adjacent face of an adjacent lug on the one hand and a ratchet arrangement on the other; for the first component to have two lugs projecting therefrom with a lug from the second component and optionally also a nut being received between the two lugs of the first component in the operative position; for a hole in the lug most remote from the entry point of the fastener to have at least one friction affording rib configured to provide resistance to the introduction of the fastener and a corresponding resistance to removal of the fastener; and for the nut to be a separate nut held captive relative to either one or other of the two components of the anchor unit, preferably in a manner enabling it to float laterally so as to be able to move into alignment with a fastener passing through the lugs.

In one preferred arrangement a central lug of a second component has a hole passing through it for receiving the fastener and the entrance to the hole has adjacent to it one, and preferably two, rounded projections for cooperation with one or more recesses that may be in the form of an end of a groove in the wall of a hole where it terminates at the inside face of an adjacent lug at the entry end of the first component of the connector.

Also preferably, the lugs of the two components of the connector have outer surfaces that not only conform substantially to the inner periphery of the aperture in the first panel, but also the lugs have faces and guides that ensure that movement of the two components towards and away from each other during assembly or disassembly is limited to movement in a direction at generally right angles to the plane of the first panel and the plane of the planar bases.

Any required urging of the components towards each other during introduction or tightening of the fastener may be achieved in different ways according to acceptable tolerances of the panels and other components and design requirements.

In one arrangement holes through the lugs may simply be forced into alignment by a tapered entry end of the fastener to draw the bases towards each other and thus into engagement with the surfaces of the first panel.

Alternatively, holes through two spaced lugs of the first component may be a close fit around the fastener to substantially inhibit transverse movement of the fastener relative to the lugs whilst the holes through the central lug of the second component may have an enlarged and optionally oval shape to permit limited transverse movement of the lug and associated base. Inclined faces on the lug and a nut holder may be configured to urge the second component towards the first component as the fastener is tightened.

The separate nut could be a conventional screw threaded nut, or alternatively, could be a shaped steel plate having two terminal angular positions, one being an entry position in which an enlarged hole is presented to the fastener as it is introduced by a simple axial movement of the fastener and an operative position in which opposite edges of the hole in the plate or engaged by screw threads on the fastener in the manner of a nut thereby permitting tightening of the fastener. In the event that the fastener is a screw threaded fastener, the nut should be held captive in a manner preventing rotation thereof. The nut could also be a spring steel plate cooperating with a fastener having a smooth or riffled external surface. The nut could also be an appropriate integral formation with a lug. The outer surface of one or other of the components of the anchor unit may further be provided with one or more formations adapted for the attachment of other accessories to the connector such as a hinge, a handle, a lock, or simply a support formation such as for a shelf or as a hanging support.

The first and second panels will generally extend at right angles to each other but it is within the scope of this invention that the connector can be configured so that the first panel extends at an incline to the second panel.

The invention also provides panels provided with apertures particularly shaped for accommodating connectors as defined above and also assemblies of panels optionally together with other components including at least some connectors as defined above.

In order that the above and other features of the invention may be more fully understood various different embodiment thereof will now be described with reference to the accompanying drawings.

BRIEF DESCRIPTION OF THE DRAWINGS

In the drawings:

FIG. 1 is an elevation of an article of furniture of a general nature that could be assembled using connectors of the present invention;

FIG. 2 is a view taken edge-on relative to a second panel and showing a first panel attached thereto using a connector according to the invention;

FIG. 3 is a section taken along line III-III in FIG. 2;

FIG. 8 is a view similar to FIG. 2 but illustrating an additional attribute of the connector;

FIG. 9 is a view from the rear of the assembled anchor unit;

FIG. 13 is a view similar to FIG. 6 illustrating the toothed rack of an optional ratchet arrangement for holding the two components of the anchor unit together;

FIG. 14 is a view similar to FIG. 7 illustrating the cooperating pawls of the ratchet arrangement;

FIG. 15 is an exploded view illustrating a variation of connector forming a right angled corner between a first and a second panel;

FIG. 16 is a sectional view of the assembled connector illustrated in FIG. 15;

FIG. 21 is an exploded view of a variation of the invention in which cooperating projections and recesses are provided for enabling the components to be clipped together in the absence of a fastener being present;

FIG. 22 is a sectional view of a first component of the top illustrated in FIG. 21 taken in the direction of line XXII to XXII in FIG. 21; and, FIG. 23 is an illustrative preferred cross-section taken through the cooperating lugs of an installed connector according to the invention.

DETAILED DESCRIPTION WITH REFERENCE TO THE DRAWINGS

Figure 4:
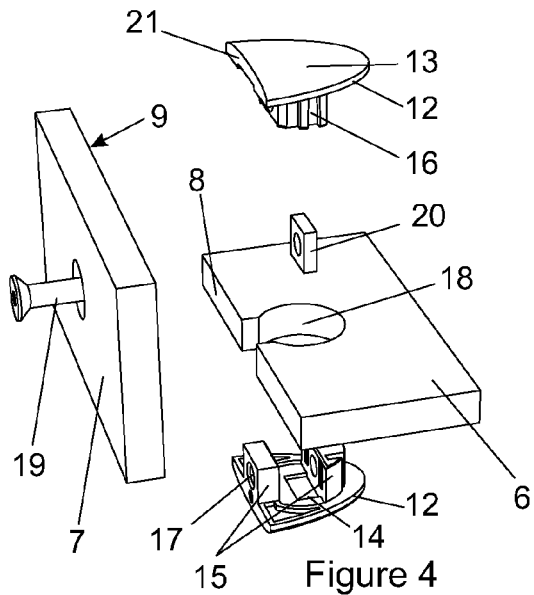
FIG. 4 is an exploded view of the assembly shown in FIGS. 2 and 3.
Figure 5:
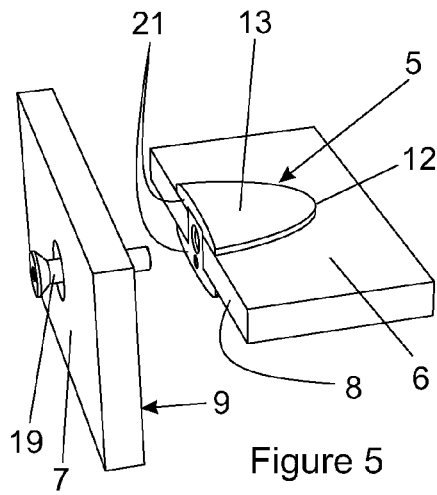
FIG. 5 is the same as FIG. 4 with the anchor unit assembled.
Figure 6:
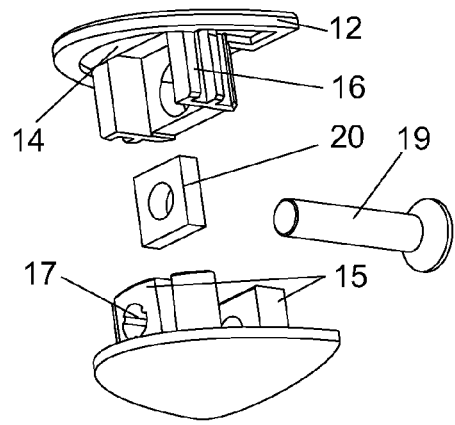
FIG. 6 is an enlarged exploded perspective view of the connector components taken from one direction.
Figure 7:
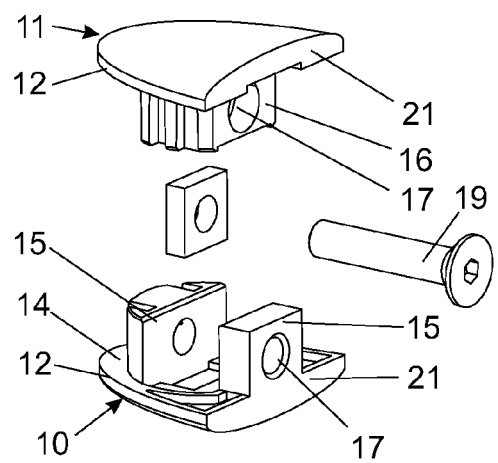
FIG. 7 is an enlarged exploded perspective view of the connector components from the opposite direction.

Connectors provided by this invention have extremely broad application in connecting panels together, irrespective of the exact nature or function to be served by the panels, and simply by way of example there is illustrated in FIG. 1 a bookshelf (1) that could be assembled using such connectors. The panels in this case include surrounding sides, top and bottom (2); shelves (3); and a back panel (4).

Referring now more particularly to FIGS. 2 to 7 of the drawings, a connector (5) according to the invention is provided for connecting a first panel (6) to a second panel (7) with the first panel having one edge (8) thereof fixed relative to a surface (9) of the second panel with the two panels extending transversely to each other, typically at right angles.

The connector comprises an anchor unit having a first component (10) and a second component (11) each of which has a generally planar base (12) having an operatively outer surface (13), and an inner surface (14).

The inner surface of the first component (10) has two spaced lugs (15) projecting therefrom whilst the second component (11) has a single central lug (16). These lugs are arranged to overlap each other in the assembled condition with transverse holes (17) passing through them in generally aligned relationship as will be quite apparent from FIG. 3. The lugs are conveniently made of an injection moulded plastics material that is selected to be particularly suitable for the purpose described herein.

The lugs have an outer periphery that is shaped for operative cooperation with an aperture (18) through the first panel inwardly of the edge (8). The aperture is generally of keyhole shape with a squat stem to the key hole opening at the edge (8) for accommodating a fastener (19) passing through the second panel and through the overlapping lugs (15) and (16) for urging the anchor unit towards the second panel to thereby connect the first and second panels together. A cooperating nut (20) is held captive on the remote side of the central lug (16) for this purpose. It is to be noted that the term captive is used particularly so that the nut may be floating in order to automatically align itself with the fastener but would be restricted against free rotation, at least in the instance of screw threaded fasteners.

The peripheral edges of the two planar bases are substantially identical and are arranged so that, in the operative position, each base entirely covers the aperture and provides a flat abutment edge (21) in a plane at right angles to that of the first panel for engaging the surface of the second panel in the assembled position.

The outer surface of the components of the anchor unit are, in the instance illustrated in FIGS. 1 to 7, adapted to contact the outer surface of the first panel and are, accordingly, made to a shallow domed configuration of an aesthetically pleasing nature.

Figure 10:
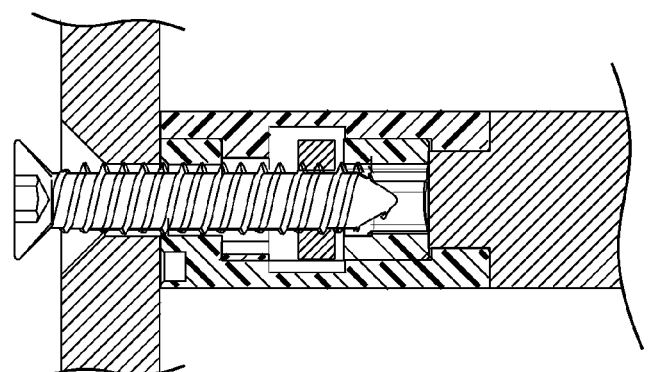
FIG. 10 is a view similar to FIG. 3 illustrating a counter sunk variation of the connector.

However, and as illustrated in FIG. 10, the bases may be made to a constant thickness with a flat outer surface that can be recessed into the surface of the first panel so as to be flush with it.

A connector as described above may be easily installed by mating the two components of the anchor unit from opposite sides of the two surfaces of the first panel so that the lugs occupy the aperture (18) to locate the connector in the plane of the first panel. The screw threaded fastener that is passed through a hole in the second panel is then introduced through the holes in the lugs and into the nut in order to secure the two panels together. Clearly, multiple connectors will be provided at spaced locations along elongate panels to be interconnected.

Whilst it is possible that a simple form of connector as described above can be employed effectively, manufacturing tolerances will generally dictate that some form of means for urging the components towards each other during introduction or tightening of the fastener be provided.

In the embodiment of the invention illustrated in FIG. 3, the holes through the lugs are arranged to be forced into alignment by a tapered entry end (22) of the fastener that is arranged to draw the bases towards each other as the end enters the somewhat misaligned holes that do not totally overlap initially. The lugs are, as the fastener is introduced, pulled or urged somewhat towards each other to thereby urge the bases into firm engagement with the surfaces of the first panel as the fastener progressively enters the holes.

Figure 11:
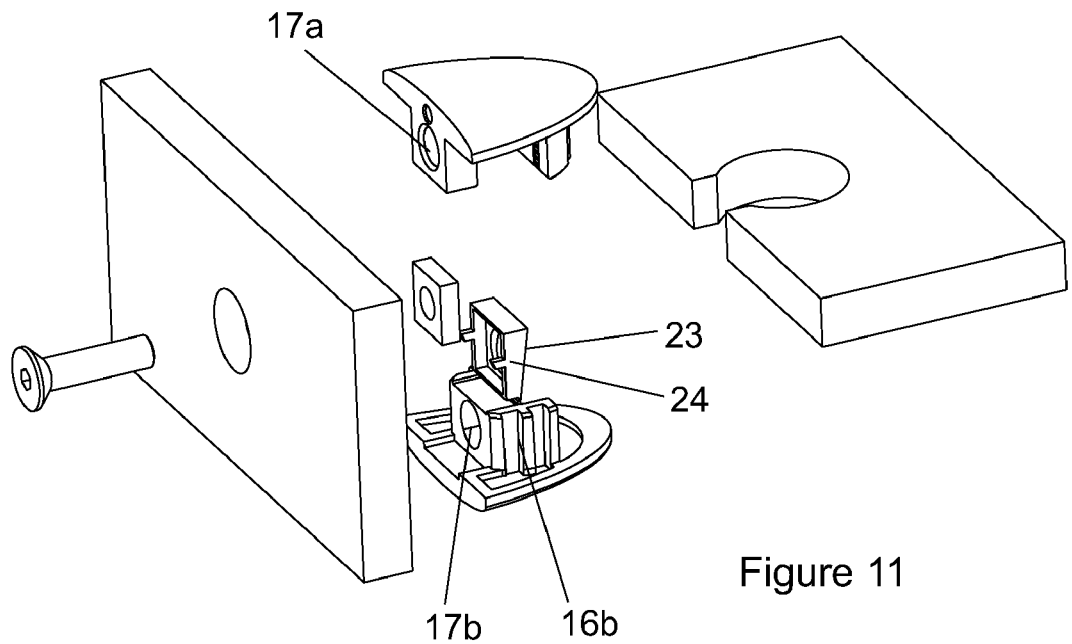
FIG. 11 is an exploded view of a variation of the connector in which a nut holder and inclined faces are used to urge the two components of the anchor unit together during fastening.
Figure 12:
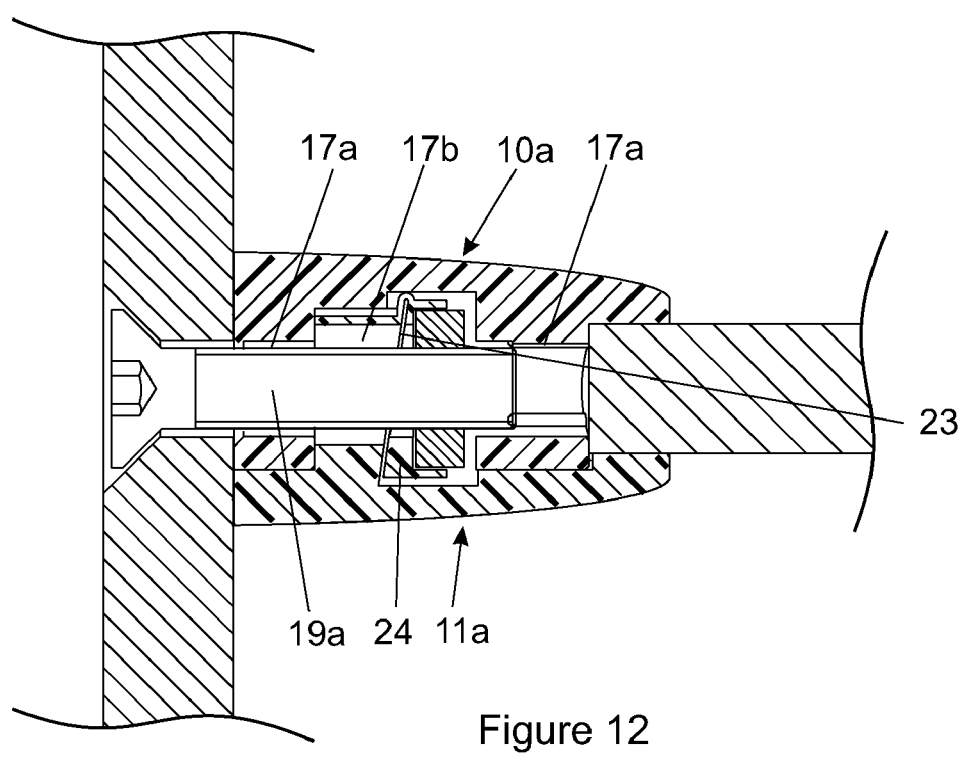
FIG. 12 is a sectional view similar to FIG. 3 of the embodiment of the invention illustrated in FIG. 11.

Alternatively, and as illustrated in FIGS. 11 and 12, the holes (17*a*) through the two spaced lugs of the first component (10*a*) may be a close fit around the fastener (19*a*) to substantially inhibit transverse movement of the fastener relative to them. The hole (17*b*) through the central lug of the second component is, however, oval to allow for the second component to be urged towards the first component as the fastener is tightened. This urging effect is achieved by means of cooperating inclined faces (23) on the lug (16*b*) and a nut holder (24).

Reverting to introduction of the fastener into its final position, and in particular with reference to FIGS. 3 and 9, the hole in the lug most remote from the entry point of the fastener is preferably provided with friction promoting ribs (25) to provide resistance to the introduction of the fastener with the aim that a corresponding resistance is provided to removal of the fastener or, more particularly, to the working loose of the fastener during use of the assembly of panels and any other components. A lock nut type of arrangement is thus provided.

As illustrated in FIG. 8, the outer surface of one or other of the components of the anchor unit may further be provided with one or more formations such as that indicated by numeral (26) adapted for the attachment of other accessories to the connector such as a hinge, a handle, a lock, or the formation may simply be a support formation such as for a shelf or as a suspension support.

In order to assist in maintaining the anchor unit in its assembled condition during further processing of the relevant panels and other components, and as illustrated in FIGS. 13 and 14, one of the lugs (15*c*) may have moulded therein rack formations (27) whilst the adjacent central lug (16*c*) carries cooperating pawl formations (28) in order to provide ratchet arrangements for retaining the two components with their lugs in overlapping cooperating relationship.

It is also possible that the two components may be adhesively secured together to maintain them in the assembled condition or, as a further alternative, they could be welded, typically ultrasonically welded together in the assembled condition.

It is to be noted that injection moulded corner connector elements (29), as illustrated in FIGS. 15 and 16, may be provided to enable the first panel (6*d*) to be connected along an edge (30) of the second panel (7*d*) to define a corner between the two panels. In this instance the corner element has a base (31) substantially identical to a base of the cooperating components of the anchor unit so that an aperture (32) adjacent the edge of the second panel can serve to align the corner element and thus the second panel with the first panel.

The corner element has a face (33) abutting the flat abutment edge of the anchor unit so that the corner element forms substantially a continuation thereof around the corner. The fastener (19d) passes through the corner element, as illustrated.

Figure 18:
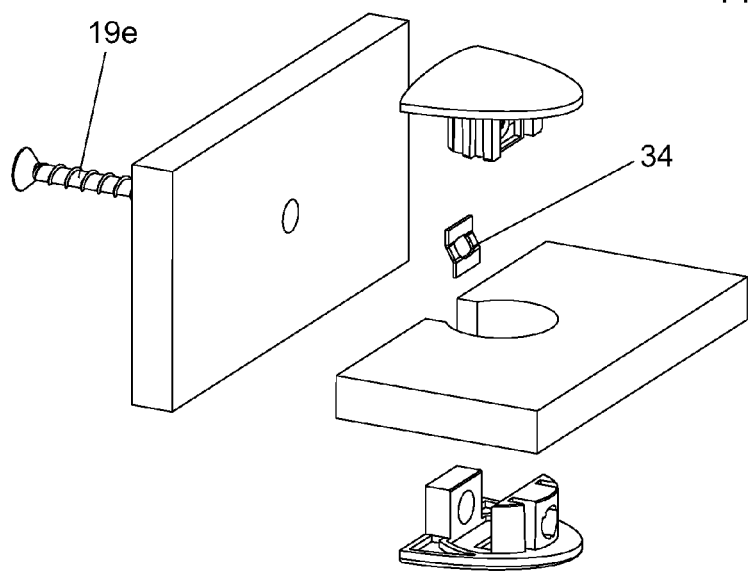
FIG. 18 is an exploded view of a variation of the invention in which the nut enables simple axial introduction of the fastener into its near final position.
Figure 19:
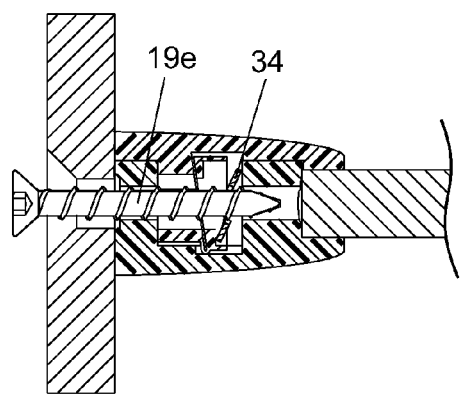
FIG. 19 is a sectional elevation of the assembled connector illustrated in FIG. 18 with the nut in its "entry" terminal position.
Figure 20:
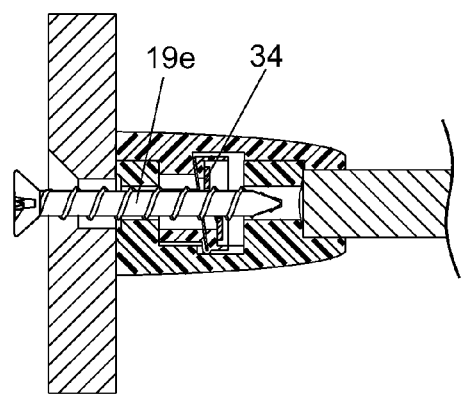
FIG. 20 is the same as FIG. 19 one but illustrating the nut in its operative terminal position.

Instead of the conventional nut described above, and as illustrated in FIGS. 18 to 20, the nut could be a shaped steel plate (34) having two terminal angular positions, one being an entry position that is illustrated in FIG. 19 in which an enlarged hole is presented to the fastener (19e) as it is introduced into the unit so that a simple axial movement of the fastener is all that is required. The other terminal angular position of the plate-like nut is its operative position in which opposite edges of the hole engage the screw threads on the fastener in the manner of a nut thereby permitting tightening of the fastener by rotating it in the normal manner.

Figure 17:
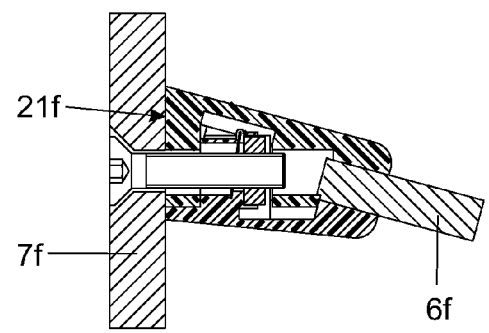
FIG. 17 is a sectional view similar to FIG. 3 illustrating a variation of the invention in which the first panel extends at an incline to the second panel.

The aforegoing is directed at two panels that extend at generally right angles to each other. It is, however, within the scope of this invention that the connector can be configured, as illustrated in FIG. 17, so that the first panel (6f) extends at an incline to the second panel (7f) simply by moulding the two components of the anchor unit to the required shape so as to present an abutment face (21f) that is appropriately angled.

Reverting now to the matter of temporarily maintaining the two components of a connector in association with each other and with an aperture in a first panel, a condition that is typically required for transport and storage purposes with the panels in a knocked down configuration, a preferred alternative to the ratchet arrangement described above is illustrated in FIGS. 21 to 23.

In this instance, a central lug (40) of a second component (41) has a hole (42) passing through it for receiving the fastener (43). Adjacent the entrance to the hole, at two diametrically opposite lateral locations, is a rounded projection (44) for cooperation with a cooperating recess (45) in the form of an end of a groove (46) in the wall of a hole (47) where it terminates at the inside face (48) of a lug (49) at the entry end of the first component (50) of the connector. The arrangement of the projections and ends of the grooves is such that a catch is formed that retains the two components of the connector in association with each other in a releasable fashion in the absence of any fastener. Prefabricated panels having the components of connectors according to the invention already attached to them can thus be made in a knocked down configuration for transport and storage purposes and, for example, to enable kits of components to be packaged.

In order to enhance the cooperation between the lugs of the two components of the connector, and as shown most clearly in FIG. 23, the outer surfaces of the lugs not only conform substantially to the inner periphery of the aperture (60) in the first panel (61), but also the lugs have faces (62) and guides (63) that ensure that movement of the two components towards and away from each other during assembly or disassembly is limited to movement in a direction at generally right angles to the plane of the first panel and the plane of the planar bases (64) of the components. In this way proper clipping of the two components of a connector together is achieved.

It will be understood that numerous variations may be made to the embodiment of variations of the invention described above without departing from the scope hereof.

The invention claimed is:

1. A connector for connecting a first panel to a second panel with the first panel having one edge thereof fixed relative to a surface of the second panel and the two panels extending transversely to each other such that the first panel extends away from the second panel at generally right angles, the connector comprising:

an anchor unit for operative cooperation with an aperture through the first panel inwardly of said one edge thereof; and a nut that is captive relative to the anchor unit for operatively receiving a fastener passing through the second panel for urging the anchor unit towards the second panel to thereby connect the first and second panels together, wherein:

the anchor unit comprises a first component and a second component each of which has a generally planar base having an operatively outer surface with a shape selected from a shallow domed configuration and a flat configuration that can be recessed into the surface of the first panel so as to be flush with it, an inner surface from which one or more attachment lugs extend, and a peripheral edge, the peripheral shape of each of the two components includes a flat abutment edge oriented in a plane at generally right angles to the planar base for engaging the surface of the second panel in the assembled position, the attachment lugs are configured to overlap in the assembled condition of the anchor unit with the lugs having holes therethrough for receiving the fastener to retain, in the operative condition, the anchor unit in the assembled condition of the connector by cooperation with the nut or the fastener, or both, and to locate the connector in a plane of the first panel, and an outer periphery of each lug is shaped for operative cooperation with the aperture through the first panel to locate the connector in the plane of the first panel.

2. The connector of claim 1, wherein the lugs are formed such that installation or tightening of the fastener results in the two components of the anchor unit being urged inwardly towards each other to firmly clamp the peripheral region of the bases against the cooperant surfaces of the first panel.

3. The connector of claim 2, wherein the holes through the lugs are configured to be forced into alignment by a tapered leading end of the fastener to draw the bases towards each other and thus into engagement with the surfaces of the first panel.

4. The connector of claim 2, wherein:

the holes through two spaced lugs of the first component are a close fit around the fastener to substantially inhibit transverse movement of the fastener relative to the lugs whilst the hole through a central lug of the second component has an enlarged shape to permit limited transverse movement of the lug and associated base, and inclined faces on the lug and a nut holder are configured to urge the second component towards the first component as the fastener is tightened.

5. The connector of claim 1, wherein the lugs of the two components overlap in the assembled condition of the anchor unit and the lugs include cooperating formations for retaining the two components in cooperating relationship in the absence of a fastener for transport and storage purposes.

6. The connector of claim 5, wherein the cooperating formations are at least one projection on a face of a lug that is at generally right angles to a fastener axis and a cooperating recess in an adjacent face of an adjacent lug.

7. The connector of claim 6, wherein the at least one projection is a rounded projection located adjacent the entrance to a hole through the lug and arranged for cooperation with one or more recesses in the form of an end of a groove in the wall of an aligned hole through an adjacent lug where that hole terminates at a surface of the lug.

8. The connector of claim 5, wherein the cooperating formations are a ratchet arrangement for retaining the two components in cooperating relationship.

9. The connector of claim 1, wherein the first component has two lugs projecting therefrom with a lug from the second component and a nut being received between the two lugs of the first component in the operative position.

10. The connector of claim 1, wherein a hole in the lug most remote from the entry point of the fastener has at least one friction affording rib configured to provide resistance to the introduction of the fastener and a corresponding resistance to removal of the fastener.

11. The connector of claim 1, wherein the lugs of the two components of the anchor unit have outer surfaces that conform substantially to the inner periphery of the aperture in the first panel, and further have faces and guides that ensure that movement of the two components towards and away from each other during assembly or disassembly is limited to movement in a direction at generally right angles to the plane of the first panel and the planes of the planar bases.

12. An assembly of a first and a second panel wherein the first panel has one edge thereof fixed relative to a surface of the second panel by means of a plurality of connectors with the two panels extending transversely to each other such that the first panel extends away from the second panel at generally right angles, wherein each connector comprises an anchor unit cooperating with an aperture through the first panel inwardly of said one edge thereof, and a nut that is captive relative to the anchor unit receives a fastener passing through the second panel and urging the anchor unit towards the second panel to thereby connect the first and second panels together, wherein the anchor unit comprises a first component and a second component each of which has a generally planar base having an operatively outer surface with a shape selected from a shallow domed configuration and a flat configuration that can be recessed into the surface of the first panel so as to be flush with it, an inner surface from which one or more attachment lugs extend, and a peripheral edge, wherein the peripheral shape of each of the two components includes a flat abutment edge oriented in a plane at generally right angles to the planar base and engaging the surface of the second panel, wherein the attachment lugs overlap in the assembled condition of the anchor unit with the lugs having holes therethrough receiving the fastener to retain the anchor unit in the assembled condition of the connector by cooperation with the nut or the fastener, or both, and to locate the connector in a plane of the first panel, and wherein an outer periphery of each lug is shaped for operative cooperation with the aperture through the first panel to thereby locate the connector in the plane of the first panel.

* * * * *